Oct. 14, 1952     W. A. FRANTZ     2,613,517

CREAMER

Filed Oct. 7, 1949

INVENTOR.
WALTER A. FRANTZ

BY *Fay, Golrick & Fay*

ATTORNEYS

Patented Oct. 14, 1952

2,613,517

UNITED STATES PATENT OFFICE 2,613,517

CREAMER

Walter A. Frantz, Shaker Heights, Ohio

Application October 7, 1949, Serial No. 120,134

1 Claim. (Cl. 65—31)

This invention is primarily directed to a liquid receptacle or creamer for use in restaurants and hotels to be placed on a saucer outwardly of a cup to hold a measured quantity of cream constructed to permit the filled receptacle to be carried safely and without spillage on a saucer and held in position between the saucer's rim and a cup normally positioned thereon. It is primarily intended to be placed and carried in this position and then, upon removal, it is capable of safe vertical standing upon any flat surface such as a table.

The principal object of the invention is the construction of such a receptacle having an outer body and a supporting bottom therefor which may be placed and carried when filled on a saucer along the side of a cup without spilling.

Other objects and advantages of the invention will be apparent from the following description of a preferred form of the invention, reference being made to the accompanying drawings wherein.

In many hotels, restaurants and cafeterias today the handling of a large quantity of coffee cups represents a serious labor problem. A waiter or waitress can carry a great number of cups but has difficulty carrying the cream along with them. It often occurs that a short cylindrical receptacle is used but this unbalances the saucer and necessitates the cup being carried partially off the center depression provided for the cup in most saucers. This is a difficult arrangement that frequently results in spilling. Of course, it may be said that a second trip might be made to bring along cream but this is time consuming and expensive. My invention is directed to a receptacle that may fit on the saucer of the cup along side of the cup that will not necessarily displace the cup from the approximate center of the saucer. Of course this receptacle must be well balanced when either empty or filled with liquid and be capable of resting on the edge of saucers that vary greatly in design or upon a flat surface at other intervals.

Figure 1:
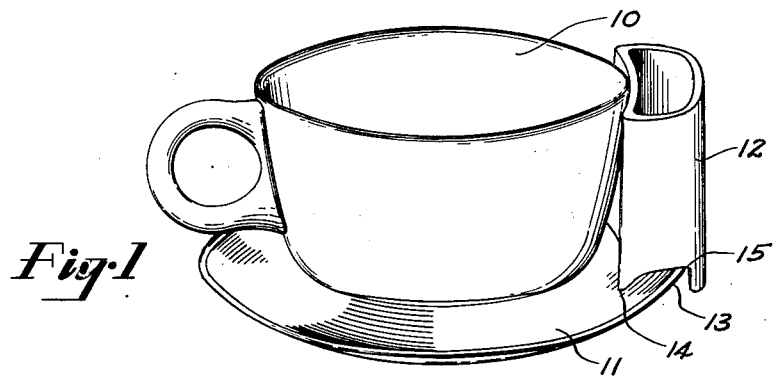
Fig. 1 is a perspective view of a cup and saucer with the creamer positioned on the saucer.

In Fig. 1, I have shown a cup 10 placed on a saucer 11 with my creamer generally designated at 12 resting on the rim 13 of the saucer. The creamer is supported by supporting edge 14 and by having the sloping bottom 15 resting on the rim 13 of the saucer. Depending upon the exact shape of the saucer and cup, my creamer may rest upon the rim and the side of the cup and be supported in the manner shown. With other cups not particularly shown here, my creamer may rest completely on the saucer and be spaced from the cup or contiguous therewith. In any event, the sloping bottom and supporting edge allow the creamer to remain in an upright position upon most saucers.

The details of my creamer are as follows. The creamer has sides 16 that are straight and vertical, shaped in the form of a crescent, i. e., concavo-convex or circular with a chord for a side. The crescent has a large arc 17 for the convex surface and a small arc 18 for the concave surface being poined at the outer edges 19 and 20. The shorter arc may be straight but as shown is preferably arcuate to allow the center of gravity to be as near the inside edge as possible. Between these two arcs is a liquid container designed to carry a quantity of cream or other beverage in a vertical position, the vertical distance 20 being considerably larger than the horizontal distance shown at 21. This particular shape provides the proper quantity of cream that is required by statute to be served in certain States or at least the quantity that an average user might find necessary to add to his coffee or to pour on cereals. It can be readily seen that this creamer can be used not only for cream to be added to coffee, tea and other beverages in addition to cream or milk that might be added to cereals but for other purposes not clearly set forth here where a similar liquid receptacle is desired upon a saucer or plate.

Figure 2:
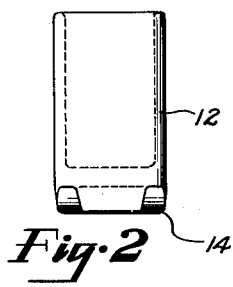
Fig. 2 is a side view of the creamer.
Figure 3:
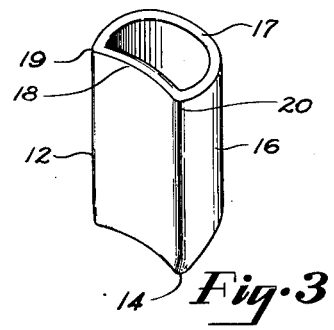
Fig. 3 is an isometric view of the creamer standing alone.
Figure 5:
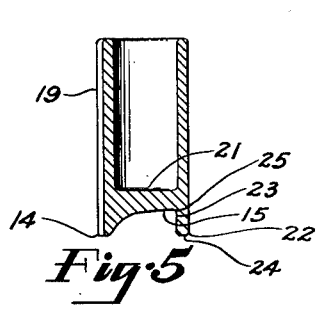
Fig. 5 is a cross section along the lines 5—5 of Fig. 4.
Figure 4:
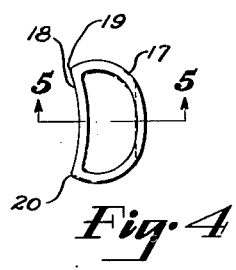
Fig. 4 is a top view of the creamer.

On the bottom of my creamer there is a sloping concave under surface generally designated at 15 sloping upwardly to a leg 22 and downwardly to a supporting edge 14. The supporting edge is the end of the short arcuate or concave side 18 as distinguished from the larger arc or convex sides 17 that forms the opposite side of the receptacle. The leg 22 is a continuation of this larger arc projecting beyond the bottom and terminating on the interior side by a plane that is roughly parallel to the extremities of the supporting edge 14 and projects vertically to the sloping concave bottom 15. The width of this leg may be seen in Fig. 2 and extends across a major portion of one side of the receptacle. The ends 24 of leg 22 and supporting edge 14 are in a plane perpendicular to the sides of the receptacle. Thus, it is seen that when the receptacle is placed upon a flat surface it will remain in an upright position and be relatively stable and not tip over. The leg 22 is shown here as an extension of one side of the receptacle but it may be readily seen that it may be of different conformation and serve the same purpose. A wide leg was chosen because this provides a larger contacting surface against the outside of rim 13 when it is placed upon a saucer, and more stability when placed on a flat surface. The sloping bottom 15 is generally concave to leg 22 and was particularly designed in the above manner to allow it to fit the various conformations of saucers and still permit the receptacle to remain upright. It can be seen by looking at the cross section in Fig. 5 or the perspective in Fig. 1 that a saucer may be sharply curved or rather gradually curved and fit anywhere along this sloping surface. This allows the receptacle to be placed on different cups without having the design altered to fit the cup.

It is my intention to make this receptacle of ceramic material, plastic, or waterproof paper as the demands of business necessitate. The basic outlines of the bottom and the arcuate inner face are the same regardless of the type of material of which the cup is made.

This particular receptacle is designed to be supported upon the saucer on the concave bottom and the supporting edge 14 resting interiorly of the rim of the saucer and the junction 25 of the leg 22 and the sloping bottom 15 will fit the rim of the saucer. On some designs of cups and saucers, it can readily be seen that the exterior concave surface of the cup will approach the shorter arcuate surface 18 of my receptacle. Thus, in some it may touch this arcuate surface and in others rest against it. In the latter event the two supporting points will be the arcuate surface of my receptacle and the concave bottom resting on the rim of the saucer. Thus, I have provided means for the receptacle to be supported in a variety of ways and still not be unduly restricted to a particular design of cup and saucer.

Although I have described but one form of the invention, it is to be understood that other forms might be adopted, all falling within the scope of the claim which follows.

Having thus described my invention, I claim:

A creamer adapted to be carried on the edge of a saucer or rested upon a flat surface, comprising an elongated, upright body consisting of a bottom wall, a vertically-extending side wall and an open top, forming a receptacle, said upright side wall having a portion of concave form throughout its length so as to conform generally to the contour of a cup carried on said saucer and the lower face of the bottom wall including an arcuate surface extending upwardly and outwardly from the lower edge of the concave side wall portion and continuing in a nearly flat, horizontal portion to a point adjacent the opposite portion of said side wall, said opposite wall portion terminating in a leg portion projecting below the said horizontal portion of the bottom surface to form a recess whereby the creamer is supported on said saucer by said concave side wall engaging the base of the saucer and with the rim of the saucer projecting into said recess and engaging the wall thereof, said leg portion and concave portion of the side wall terminating in the same plane so that said creamer may stand in upright position upon a flat surface.

WALTER A. FRANTZ.

REFERENCES CITED

The following references are of record in the file of this patent:

UNITED STATES PATENTS

| Number | Name | Date |
|---|---|---|
| 352,400 | Dowkontt | Nov. 9, 1886 |
| 1,228,473 | Panay | June 5, 1917 |
| 1,272,996 | Poschadel | July 16, 1918 |
| 1,596,133 | Wellen | Aug. 17, 1926 |
| 1,608,253 | Stelzer | Nov. 23, 1926 |
| 1,677,845 | Pinney | July 17, 1928 |
| 1,948,932 | McMickle | Feb. 27, 1934 |
| 2,207,417 | Smith | July 9, 1940 |
| 2,235,502 | Leppke | Mar. 18, 1941 |
| 2,314,835 | Johns et al. | Mar. 23, 1943 |
| 2,348,028 | Rasch | May 2, 1944 |
| 2,583,951 | Kliegel | Jan. 29, 1952 |